(12) United States Patent
Stundner et al.

(10) Patent No.: US 8,781,879 B2
(45) Date of Patent: Jul. 15, 2014

(54) SYSTEM AND METHOD OF FACILITATING PETROLEUM ENGINEERING ANALYSIS

(75) Inventors: Michael Stundner, Baden (AT); Gustavo Nunez, Baden (AT); Georg Zangl, Laxenburg (AT); Herwig Fruhbauer, Perchtoldsdorf (AT)

(73) Assignee: Schlumberger Technology Corporation, Sugar Land, TX (US)

( * ) Notice: Subject to any disclaimer, the term of this patent is extended or adjusted under 35 U.S.C. 154(b) by 368 days.

(21) Appl. No.: 12/939,316

(22) Filed: Nov. 4, 2010

(65) Prior Publication Data

US 2012/0117104 A1    May 10, 2012

(51) Int. Cl.
*G06Q 10/00* (2012.01)

(52) U.S. Cl.
USPC ............ 705/7.36; 705/7.11; 703/10; 707/758

(58) Field of Classification Search
None
See application file for complete search history.

(56) References Cited

U.S. PATENT DOCUMENTS

| | | | |
|---|---|---|---|
| 6,829,570 B1* | 12/2004 | Thambynayagam et al. | 703/10 |
| 6,895,573 B2* | 5/2005 | Nørgaard et al. | 717/100 |
| 6,980,940 B1* | 12/2005 | Gurpinar et al. | 703/10 |
| 8,214,243 B2* | 7/2012 | Graham et al. | 705/7.22 |
| 2002/0056769 A1* | 5/2002 | Murakami | 241/23 |
| 2004/0103376 A1* | 5/2004 | Pandey | 715/526 |
| 2005/0154691 A1* | 7/2005 | Higgins et al. | 706/46 |
| 2006/0195510 A1* | 8/2006 | McNally | 709/203 |
| 2007/0088600 A1* | 4/2007 | Lichtinger et al. | 705/10 |
| 2008/0091496 A1* | 4/2008 | Gurpinar et al. | 705/8 |
| 2008/0126168 A1* | 5/2008 | Carney et al. | 705/8 |
| 2008/0228830 A1* | 9/2008 | Hawtin | 707/200 |
| 2008/0255892 A1* | 10/2008 | Orangi et al. | 705/7 |
| 2008/0306803 A1* | 12/2008 | Vaal et al. | 705/8 |
| 2009/0020284 A1* | 1/2009 | Graf et al. | 166/250.15 |
| 2009/0024443 A1* | 1/2009 | Graham et al. | 705/9 |
| 2009/0063230 A1* | 3/2009 | Broussard et al. | 705/7 |
| 2009/0152005 A1* | 6/2009 | Chapman et al. | 175/24 |
| 2010/0042458 A1* | 2/2010 | Rashid et al. | 705/8 |
| 2010/0088082 A1* | 4/2010 | Ingham et al. | 703/10 |
| 2010/0121861 A1* | 5/2010 | Marsden et al. | 707/752 |
| 2011/0071875 A1* | 3/2011 | Stenhaug et al. | 705/7.36 |

* cited by examiner

*Primary Examiner* — Hung Le
(74) *Attorney, Agent, or Firm* — Colin L. Wier; Rodney Warfford; Alec J. McGinn

(57) ABSTRACT

The present invention provides a system and method capable of facilitating the efficient analysis of oilfield data utilizing at least one computer database containing a plurality of stored petroleum engineering operations. In one embodiment, stored petroleum engineering operations may include individual petroleum engineering tasks/calculations, workflows comprising multiple engineering tasks/calculations, and/or third party applications capable of analyzing at least a portion of collected oilfield data. In one embodiment, petroleum engineering operations may be proven in the field, i.e., tested and proven to be accurate under real-world oilfield conditions, prior to storage upon the database. In one embodiment, the present invention provides a graphic user interface adapted to receive customer data and identify stored engineering operations associated thereto. Identified engineering operations stored upon the database may then be displayed and executed according to user instructions and/or predefined execution arrangements.

18 Claims, 5 Drawing Sheets

SYSTEM AND METHOD OF FACILITATING PETROLEUM ENGINEERING ANALYSIS

FIELD OF THE INVENTION

The present invention relates generally to petroleum engineering and, more particularly, to systems and methods of facilitating petroleum engineering analysis.

BACKGROUND

Oilfield projects generate a great deal of electronic data. Such data may be used to access oilfield conditions and make decisions concerning future oilfield operations such as well planning, well targeting, well completions, production rates, and other operations and/or operating parameters. Often this information is used to determine when (and/or where) to drill new wells, re-complete existing wells, or alter wellbore production characteristics.

Oilfield data may be collected using sensors positioned about the oilfield. For example, sensors in the drilling equipment may monitor drilling conditions, sensors in the wellbore may monitor fluid composition, sensors located along the flow path may monitor flow rates, and sensors at the processing facility may monitor fluids collected.

The volume of data generated during an oilfield project presents unique challenges with respect to the identification and quality of data to be utilized during petroleum engineering analysis. As such, there remains a need for a system and method capable of facilitating the efficient and effective analysis of oilfield data.

SUMMARY

Accordingly, the present invention provides a system and method capable of facilitating the efficient analysis of oilfield data utilizing at least one computer database containing a plurality of stored petroleum engineering operations. In one embodiment, stored petroleum engineering operations may include individual petroleum engineering tasks/calculations, workflows comprising multiple engineering tasks/calculations, and/or third party applications capable of analyzing at least a portion of collected oilfield data. In one embodiment, petroleum engineering operations may be proven in the field, i.e., tested and proven to be accurate under real-world oilfield conditions, prior to storage upon the database.

In one embodiment, the present invention provides at least one graphic user interface (GUI) adapted to (1) receive customer data entered by the user; and (2) identify stored engineering operations associated with the customer data. Identified engineering operations stored upon the database may then be displayed and executed according to user instructions and/or predefined execution arrangements.

Further, the present invention may provide a GUI designed to assist the customer in ascertaining the appropriate input data for one or more petroleum engineering operation(s). In one embodiment, petroleum engineering operations are displayed such that the user may select one or more of them. Upon receiving a selection by the user, the database is searched to identify the input data that would be required to execute the selected petroleum engineering operation(s). Once the input data has been provided to the system, the user may select one or more of the identified petroleum engineering operations for execution.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; it being understood that the drawings contained herein are not necessarily drawn to scale; wherein.

DETAILED DESCRIPTION

In the following description, numerous details are set forth to provide an understanding of the present invention. However, it will be understood by those skilled in the art that the present invention may be practiced without these details and that numerous variations or modifications from the described example embodiments may be possible.

Figure 1:
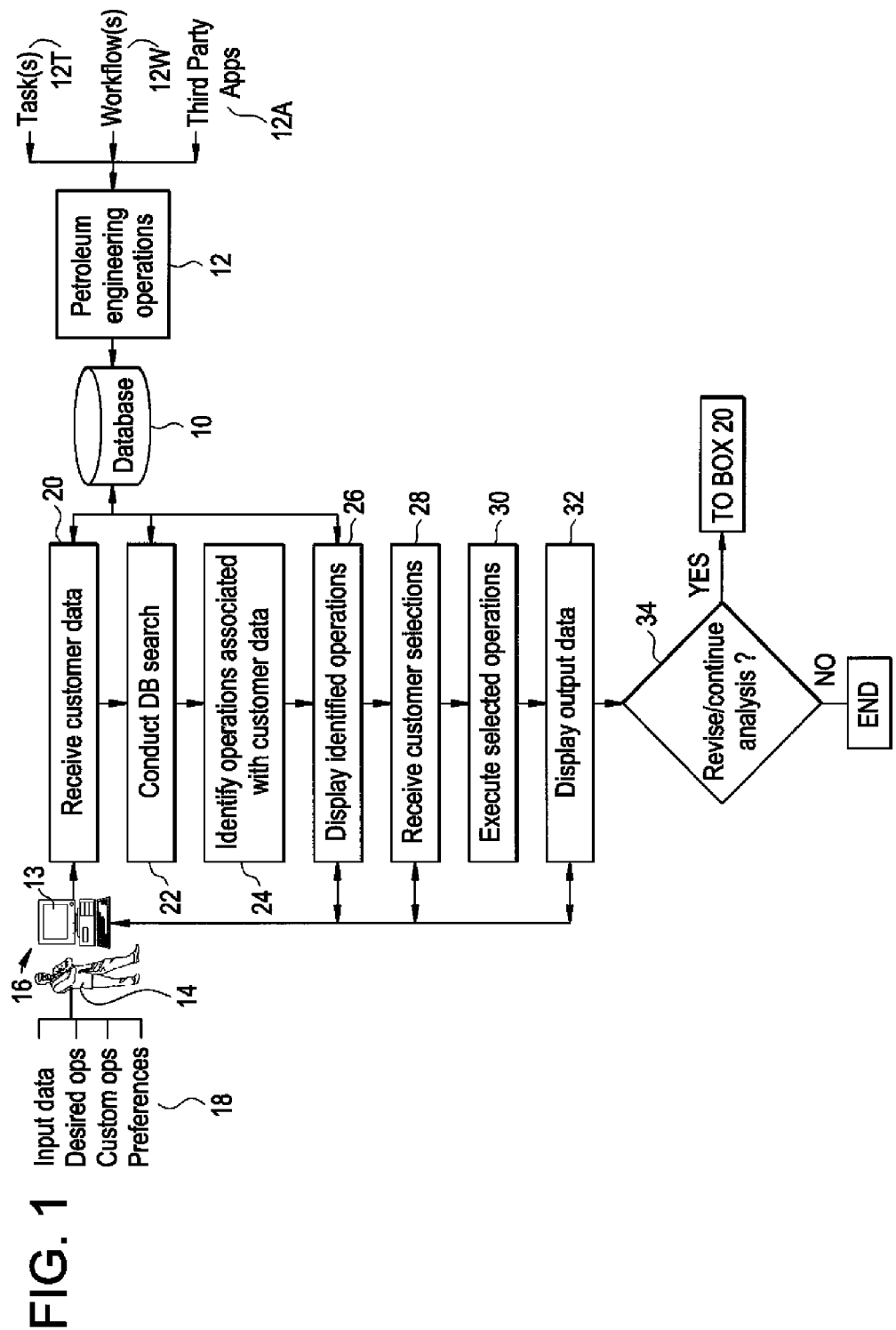
FIG. 1 is a flowchart diagram illustrating the engineering operation execution process of one embodiment of the present invention.

The present invention is herein described as a computer implemented method of facilitating petroleum engineering analysis, as a computer-readable storage medium for facilitating petroleum engineering analysis and as a petroleum engineering analysis system. Referring to FIG. 1, the present invention utilizes one or more computer databases (10). The computer database (10) of the present invention may be any suitable storage device, whether part of a stand alone storage device or as part of a larger computer system. The database of the present invention may be accessed and/or updated via one or more computer networks.

In one embodiment, petroleum engineering operations are collected and stored upon the database (10). Petroleum engineering operations (12) may include petroleum engineering tasks (12T), petroleum engineering workflows (12W), and/or third party petroleum engineering applications (12A) capable of analyzing at least a portion of collected oilfield data. In one embodiment, petroleum engineering tasks may be individual engineering calculations, such as drawdown or gaslift equations/calculations. Workflows may be groups of tasks and/or third party engineering applications used in combination.

The present invention allows petroleum engineering operations to be retrieved and conducted in a predicable and efficient manner. Many known systems lack data conditioning workflows, resulting in data analysis bottlenecks and/or delays. User knowledge captured and made available by the present invention facilitates the creation and application of predefined and/or customized workflows. In one embodiment, the present invention further allows petroleum engineering operations to be standardized and centrally managed such that comparable analysis results are available for future operations.

Stored engineering operations may be gleaned from previous oilfield projects, from knowledge in the field, and from best practices information. In one embodiment, each engineering operation placed upon the database may be associated with a particular type of real world oilfield problem. This may be accomplished using metadata or other suitable data storage conventions. This feature of the present invention allows stored operations to be matched to a particular oilfield application via query tool(s), as described in greater detail below. In one embodiment, petroleum engineering operations may be proven in the field, i.e., tested and proven to be accurate under real-world oilfield conditions, prior to storage upon the database.

The database (10) of the present invention provides a storehouse of oilfield knowledge that may be accessed by the user (14) using one or more graphic user interfaces (13). The graphic user interface of the present invention may be provided on a computer (16) and may be accessible via one or more computer networks. In one embodiment, the GUI of the present invention facilitates the entry of customer data into the system.

Data may be manually entered into the system by the user or downloaded using any suitable downloading technique. In one embodiment, customer data may take the form of available input data, desired operations, custom operations and/or preference data, as illustrated by arrow (18) of FIG. 1.

Upon receipt of customer data, the present invention may query the database in order to identify stored engineering operations associated with the customer data, as illustrated by Boxes 20, 22, and 24. The present invention provides various query tools and graphic user interfaces to facilitate the efficient retrieval of stored petroleum engineering operations, as described in greater detail below. Database query results may be displayed upon the GUI for review by the user, as illustrated by Box 26.

Upon reviewing the query results, the user may select one or more of the identified petroleum engineering operations associated with the input data to be executed, as illustrated by Box 28. The selected engineering operations may be executed and the results displayed to the user, as illustrated by Boxes 30 and 32. In one embodiment, the present invention allows the user to amend and/or revise the engineering operations to be performed, as illustrated by Box 34. In some cases, this will require entry of additional customer data, such as custom operations, into the system.

Figure 2:
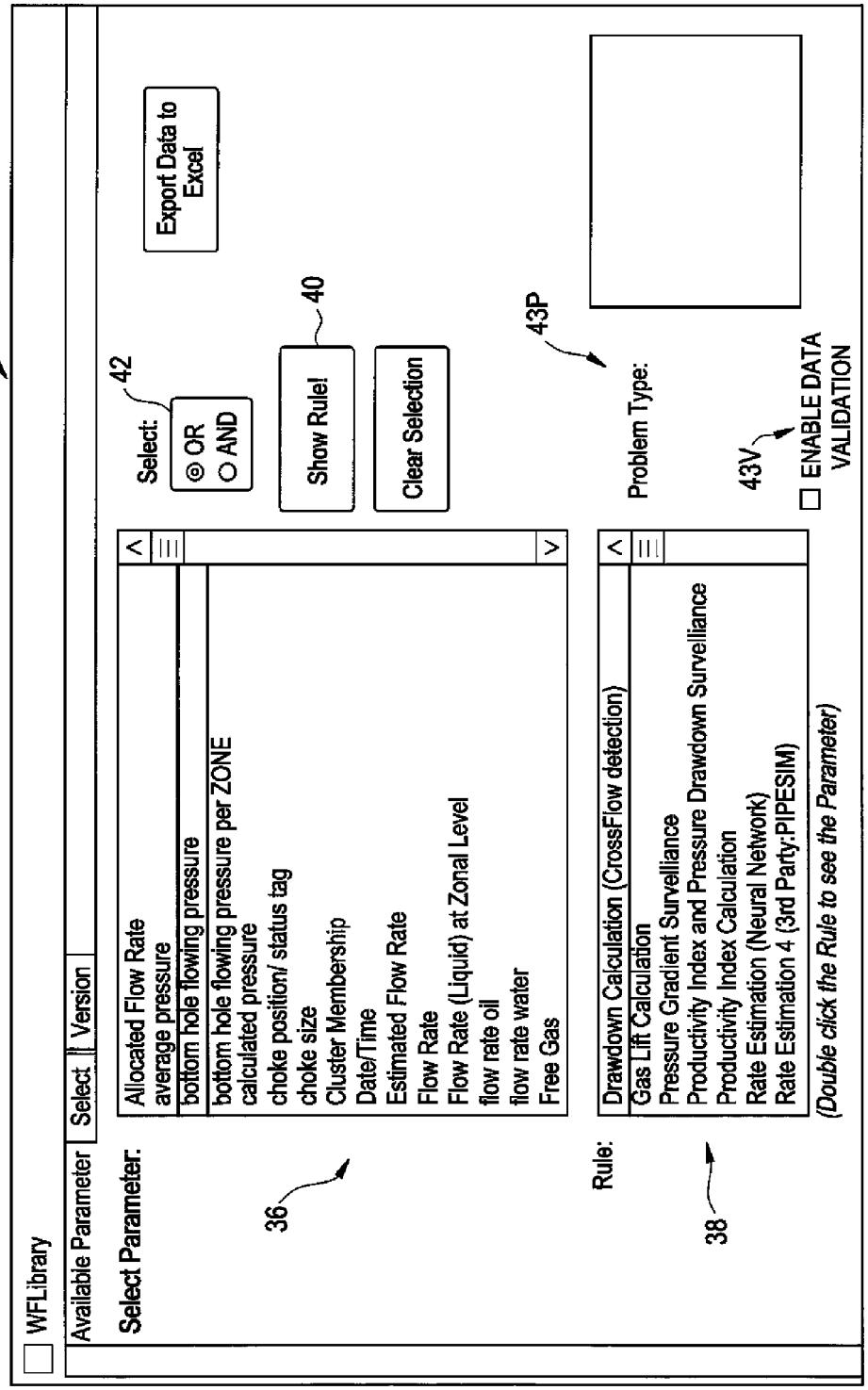
FIGS. 2-4 are example graphic user interfaces that may be used in conjunction with one or more embodiments of the present invention.

Referring to FIG. 2, the present invention may provide a GUI designed to receive available customer input data (illustrated by arrow 36), retrieve associated petroleum engineering operations stored on the database via a suitable search mechanism, and then display the retrieved operations (illustrated by arrow 38) to the customer. In the example shown in FIG. 2, the customer may select the input data that he or she has available ("bottom hole flowing pressure" in this example) using a mouse or other input device. The customer may then click on the "Show Rule" button (40) which causes the petroleum engineering operations stored on the database (10) that may be calculated using available input data (in this example "bottom hole flowing pressure") to be displayed. In one embodiment, the present invention may also provide an option to allow the customer to enter multiple, or alternative, input data parameter(s) as illustrated by the "Select AND/OR" button (42) on FIG. 2.

Once the applicable petroleum engineering operations have been identified and displayed to the user, he or she may select one or more of the identified petroleum engineering operations (38) for execution. In one embodiment, this may be accomplished by the customer clicking on the operation(s) he or she wishes to execute and confirming that the execution should be performed.

In one embodiment, the present invention provides data validation functionality to ensure that executed petroleum engineering operations are valid. Data validation may be performed upon receipt of input data from the customer or at any point of the analysis process. In one embodiment, the present invention provides input data guidelines that may be used to access the validity of input data entered by the customer or otherwise made available to the system.

For example, input data guidelines may comprise validity ranges for a given set of input data, e.g., a value of 50-100, such that a value outside the validity range may be rejected and/or brought to the attention of the customer. This feature of the present invention enhances the efficiency of the analysis process by identifying suspect data and allowing for correction prior to further analysis. In one embodiment, the GUI of the present invention provides a validity option (43V), i.e., a check box or other suitable interface, through which the customer may activate or deactivate validity functionality for one or more input data parameters.

In one embodiment, stored engineering operations held on the database may be associated with engineering problems likely to be encountered during an oilfield project. This may be accomplished via metadata or any other suitable data storage conventions. In one embodiment, the GUI of the present invention provides a problem type option (43P), i.e., a check box or other suitable interface, through which the user may specify the type of engineering problem at issue. For example, during a gas well project involving the production of excess liquid, the customer may enter a query drawn to "liquid loading," such that the system retrieves stored petroleum engineering operations applicable to liquid loading problems.

Figure 3:
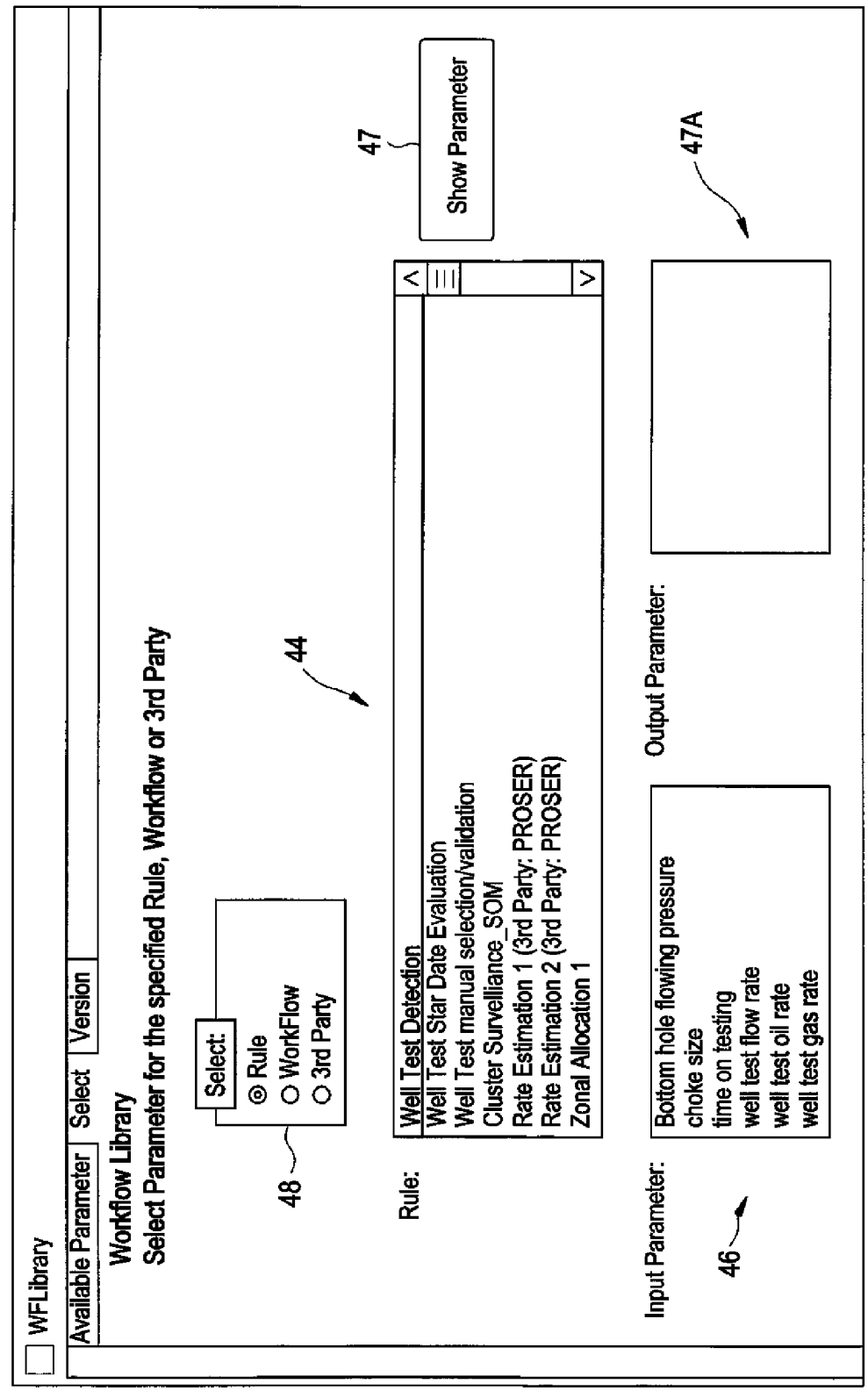

Referring to FIG. 3, the present invention may provide a GUI designed to assist the customer in ascertaining the appropriate input data for a given petroleum engineering operation. In the example embodiment of FIG. 3, a plurality of petroleum engineering operations are displayed (illustrated by arrow (44)) such that the customer may select one or more of them. Upon receiving a selection by the customer, i.e., "well test detection" in the example of FIG. 3, the database is searched to identify the input data that would be required to execute the selected petroleum engineering operation(s). In one embodiment, the user's selection is submitted by clicking on the "show parameter" button (47). The identified input data may then be displayed to the user, as indicated by arrow (46).

Identified input data may then be manually entered into the system by the user or downloaded using any suitable downloading technique. Once the input data has been provided to the system, the user may select one or more of the identified petroleum engineering operations for execution and the results are displayed to the user. Output data (47A) associated with the selected engineering operation(s) may also be displayed.

In one embodiment, the database of the present invention also includes historical information regarding each engineering operation. Historical information may include information such as when and where stored engineering operations have been used, the number of times they have been used, the type of problems they have been used to solve, etc. Historical information may be stored upon the database and presented to the user when he or she highlights or selects an engineering operation using a mouse or other input device. In one embodiment, a balloon or box (not shown) may be displayed adjacent to a selected or highlighted engineering operation. This feature of the present invention helps the user determine the applicability and/or reliability of the engineering operation(s) in question for their particular project.

In one embodiment, the customer may select from any number of petroleum engineering operations including, but not limited to individual rules/tasks, workflows, and/or third party applications, alone or in combination, as illustrated by Box (48) of FIG. 3. Further, petroleum engineering operations (44) and/or other data displayed to the user may be filtered according to any number of conventions. For example, such information may be filtered by the engineering problem at issue, the type of oilfield, etc.

Figure 4:
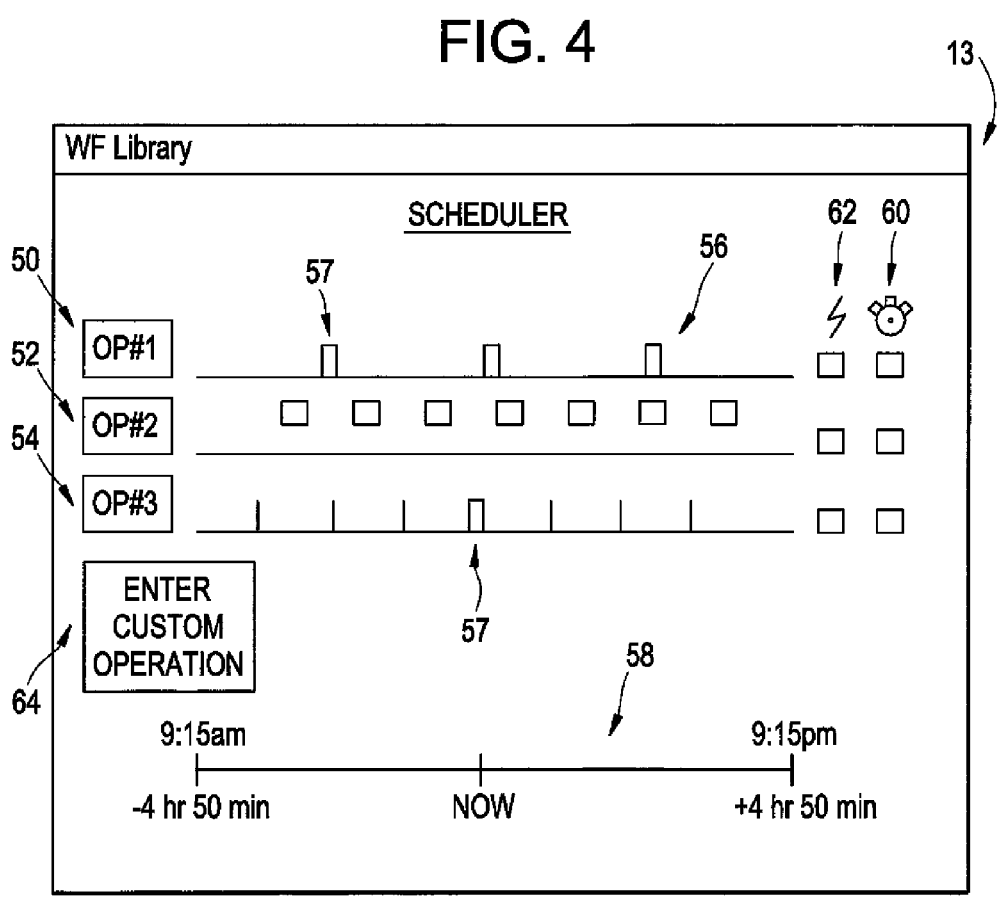

In one embodiment, the present invention provides one or more scheduling features designed to assist the user with scheduling the execution of petroleum engineering operations. Referring to FIG. 4, in one embodiment, the present invention provides a GUI (13) through which the user may enter instructions and/or preferences with respect to the manner in which engineering operations are executed by the system and/or monitor the status of one or more engineering operations scheduled for execution. In one embodiment, engineering operations may be executed in a particular order, during a particular time frame, and/or in response to an event, such as the completion of other engineering operation(s).

FIG. 4 illustrates an example embodiment where a series of engineering operations have been selected by the user. In this example, Operation Nos. 1, 2, and 3 (50, 52, and 54, respectively) represent engineering operations that have been selected for execution. To the right of each example operation are timelines (56) illustrating when each respective engineering operation is to be performed by the system. In this example, boxes (57) placed on each timeline (56) may be used to illustrate when engineering operation(s) are to be performed using the time scale at the bottom of the GUI (58).

In one embodiment, boxes may be color coded to indicate the execution status of an engineering operation. For example, red may be used to indicate that a given operation has failed to execute due to an error, such as invalid input data. A green color may be used to indicate that an engineering operation is in the process of executing, while yellow may indicate that the operation is to be executed in the future.

Icons and check boxes may be provided adjacent to each timeline (56) in the example of FIG. 4. In one embodiment, this feature of the present invention allows the user to adjust the execution parameters for each engineering operation. In this example, an icon in the shape of a clock (60) is used to denote using time to trigger the execution of an engineering operation, while a lightning icon (62) is used to denote using an event to trigger the execution of an engineering operation. For example, in order to set Operation #1 (50) to occur at a certain time, the user may click the check box under the clock icon (60) adjacent to Operation #1.

Upon receiving such an indication from the user, the system may present a pop-up screen (not shown) wherein the user may enter specific information regarding the execution timing of Operation #1. Likewise, in order to set Operation #1 (50) to occur in relation to an event, the user may click the check box under the lightning icon (62) adjacent to Operation #1. Upon receiving such an indication from the user, the system may present a pop-up screen (not shown) wherein the user may enter specific information regarding the execution of Operation #1 in relation to one or more events.

In one embodiment, the present invention provides a customizing feature wherein the user may indicate a desire to enter one or more custom engineering operations, as illustrated by Box 64. In one embodiment, the present invention provides a GUI (not shown) wherein the user may enter their own engineering operations and store them on the database to be used in conjunction with those stored upon the system. This may be accomplished by providing field(s) for data entry including, but not limited to, entry of custom calculations and/or decision hierarchies.

Figure 5:
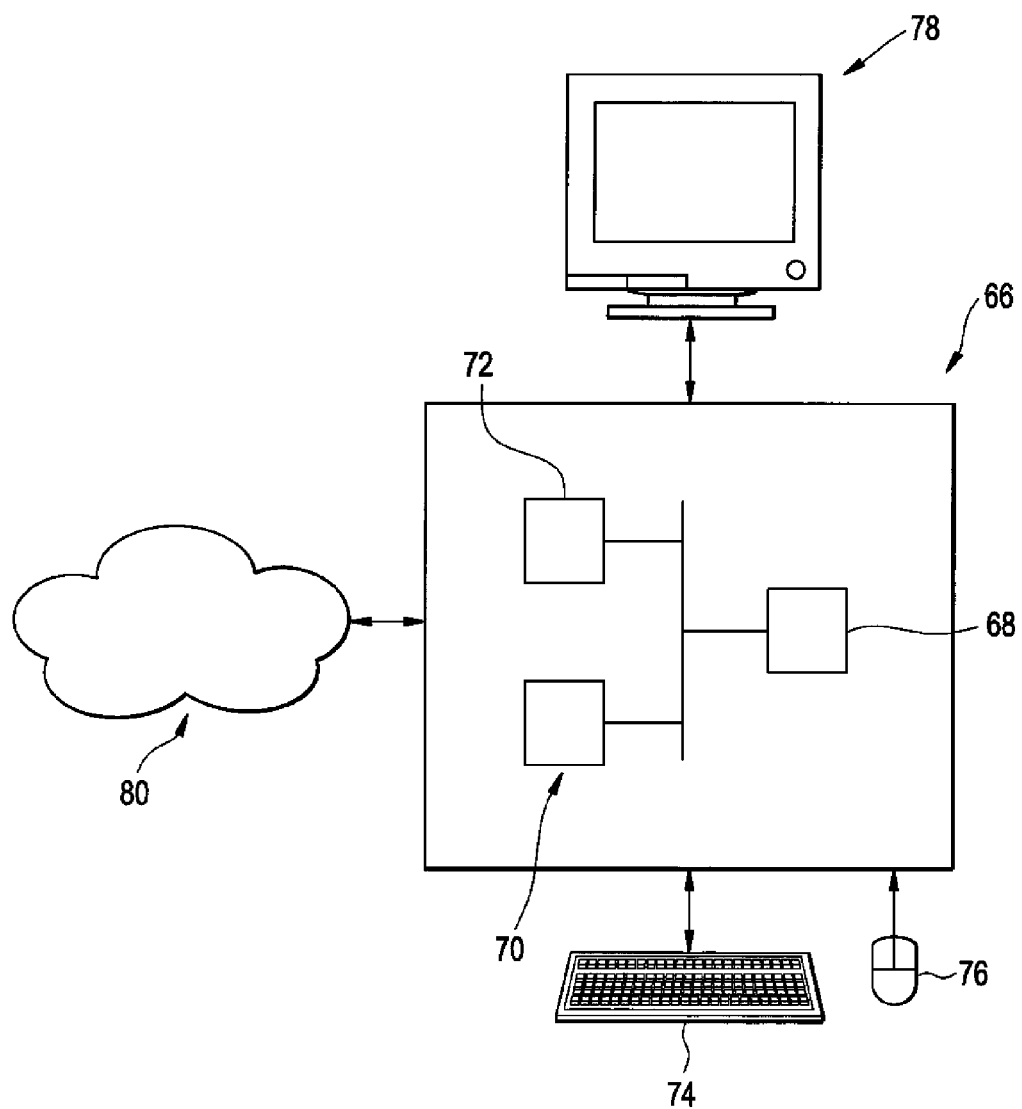
FIG. 5 is a component diagram illustrating an example computer system that may be utilized in conjunction with one embodiment of the present invention.

The present invention may be implemented on virtually any type of computer regardless of the platform being used. Referring to FIG. 5, a computer system (66) includes a processor (68), associated memory (70), a storage device (72), and numerous other elements and functionalities typical of modern computers (not shown). The computer (66) may also include input devices, such as a keyboard (74) and a mouse (76), and output devices, such as a display monitor (78). The computer system (66) may be connected to a local area network (LAN) or a wide area network (e.g., the Internet) (80) via a network interface connection (not shown). Those skilled in the art will appreciate that these input and output devices may take other forms, now known or later developed. Further, those skilled in the art will appreciate that one or more elements of the aforementioned computer system (66) may be located at a remote location and connected to the other elements over a network.

The invention may be implemented on a distributed system having a plurality of individual computer systems, where each portion of the invention may be located on a different system within the distributed system. The present invention may also be implemented upon a hand-held or other portable computing device. Further, software instructions to perform embodiments of the invention may be stored on a computer readable medium such as a compact disc (CD), DVD, diskette, tape, file, hard drive, or any other suitable computer readable storage device.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

What is claimed is:

1. A computer implemented method of facilitating petroleum engineering analysis comprising:
   providing a computer database;
   storing petroleum engineering operations to said database;
   receiving customer data relating to a petroleum engineering project;
   utilizing said customer data, searching said database and identifying engineering operations associated with said customer data;
   displaying said identified engineering operations;
   executing one or more of said identified engineering operations;
   storing historical information pertaining to said engineering operations upon said computer database;
   displaying said historical information to the user;
   wherein at least one of said engineering operations comprises a custom workflow entered by a prior user and wherein said historical information comprises the name of the prior user, the name or location of the petroleum engineering project where the custom workflow was utilized, and the date upon which the custom workflow was utilized;
   wherein said identified engineering operations are executed according to a schedule entered by the user through a graphic user interface coupled to said database, wherein said graphic user interface displays at least one timeline for each identified engineering operation and one or more adjustable scheduling parameters for each identified engineering operation; and
   wherein the customer data comprises at least one custom engineering operation entered by the user.

2. The computer implemented method of claim 1, wherein said engineering operations comprise petroleum engineering tasks, workflows, or third party applications.

3. The computer implemented method of claim 1, wherein said customer data comprises desired engineering operations.

4. The computer implemented method of claim 1, wherein said engineering operations are proven in the field prior to storage upon said database.

5. The computer implemented method of claim 1, further comprising:
storing validity information comprising at least one data validity threshold range upon said database; and
comparing at least a portion of said customer data to said validity threshold range.

6. The computer implemented method of claim 5, further comprising:
if said customer data is outside of said validity threshold range, displaying a notice to the user.

7. A non-transitory computer-readable storage medium for facilitating petroleum engineering analysis comprising instructions which, when executed, cause a computing device to:
receive and store customer data relating to a petroleum engineering project upon a computer database, said database containing stored petroleum engineering operations;
search said database utilizing said customer data to identify engineering operations associated with said customer data;
display said identified engineering operations;
execute one or more of said identified engineering operations;
store historical information pertaining to said engineering operations upon said computer database;
display said historical information to the user;
wherein at least one of said engineering operations comprises a custom workflow entered by a prior user and wherein said historical information comprises the name of the prior user, the name or location of the petroleum engineering project where the custom workflow was utilized, and the date upon which the custom workflow was utilized;
wherein said identified engineering operations are executed according to a schedule entered by the user through a graphic user interface coupled to said database, wherein said graphic user interface displays at least one timeline for each identified engineering operation and one or more adjustable scheduling parameters for each identified engineering operation; and
wherein the customer data comprises at least one custom engineering operation entered by the user.

8. The computer-readable storage medium of claim 7, wherein said engineering operations comprise petroleum engineering tasks, workflows, or third party applications.

9. The computer-readable storage medium of claim 7, wherein said customer data comprises desired engineering operations.

10. The computer-readable storage medium of claim 7, wherein said engineering operations are proven in the field prior to storage upon said database.

11. The computer-readable storage medium of claim 7, wherein the instructions, when executed, cause the computing device to:
store validity information comprising at least one data validity threshold range upon said database; and
compare at least a portion of said customer data to said validity threshold range.

12. The computer-readable storage medium of claim 11, wherein the instructions, when executed, cause the computing device to:
display a notice to the user if said customer data is outside of said validity threshold range.

13. A petroleum engineering analysis system comprising:
a processor configured to receive customer data relating to a petroleum engineering project and to store said customer data upon a computer database, said database containing stored petroleum engineering operations;
search said database utilizing said customer data to identify engineering operations associated with said customer data;
display said identified engineering operations;
execute one or more of said identified engineering operations;
store historical information pertaining to said engineering operations upon said computer database;
display said historical information to the user;
wherein at least one of said engineering operations comprises a custom workflow entered by a prior user and wherein said historical information comprises the name of the prior user, the name or location of the petroleum engineering project where the custom workflow was utilized, and the date upon which the custom workflow was utilized;
wherein said identified engineering operations are executed according to a schedule entered by the user through a graphic user interface coupled to said database, wherein said graphic user interface displays at least one timeline for each identified engineering operation and one or more adjustable scheduling parameters for each identified engineering operation; and
wherein said customer data comprises at least one custom engineering operation entered by the user.

14. The petroleum engineering analysis system of claim 13, wherein said engineering operations comprise petroleum engineering tasks, workflows, or third party applications.

15. The petroleum engineering analysis system of claim 13, wherein said customer data comprises desired engineering operations.

16. The petroleum engineering analysis system of claim 13, wherein said engineering operations are proven in the field prior to storage upon said database.

17. The petroleum engineering analysis system of claim 13, wherein the processor is configured to:
store validity information comprising at least one data validity threshold range upon said database; and
compare at least a portion of said customer data to said validity threshold range.

18. The petroleum engineering analysis system of claim 17, wherein the processor is configured to:
display a notice to the user if said customer data is outside of said validity threshold range.

* * * * *